J. E. HETHERINGTON.

Artificial Honey-Comb Foundation.

No. 8,962. Reissued Nov. 11, 1879.

Witnesses
Otto Supplaind
William Miller

Inventor
John E. Hetherington
by
Van Santvoord & Hadff
his attorneys

UNITED STATES PATENT OFFICE.

JOHN E. HETHERINGTON, OF CHERRY VALLEY, NEW YORK.

IMPROVEMENT IN ARTIFICIAL HONEY-COMB FOUNDATIONS.

Specification forming part of Letters Patent No. 208,595, dated October 1, 1878; Reissue No. 8,962, dated November 11, 1879; application filed July 14, 1879.

*To all whom it may concern:*

Be it known that I, JOHN E. HETHERINGTON, of Cherry Valley, in the county of Otsego and State of New York, have invented a new and useful Improvement in Artificial Honey-Comb Foundations, which improvement is fully set forth in the following specification, reference being had to the accompanying drawings, in which—

Figure 1:
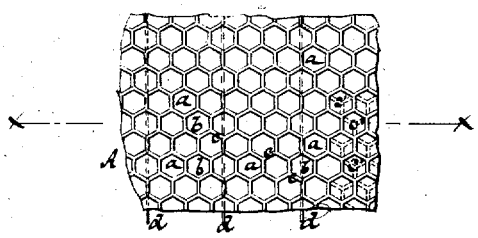
Figure 2:
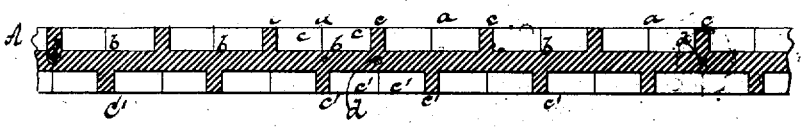

Figure 1 represents a front view. Fig. 2 is a transverse vertical section in the plane *x x*, Fig. 1, on an enlarged scale.

Similar letters indicate corresponding parts.

This invention consists in a honey-comb foundation produced from a cake of wax having on each side a series of hexagonal depressions with flat bottoms, said bottoms forming a continuous sheet, from each side of which rise the ribs which form the borders of the hexagonal depressions, whereby the cost of such honey-comb foundations is reduced and the durability of the article is increased; also, in the combination, with an artificial honey-comb foundation produced from wax, of wires or other strands which pass through the foundation and prevent it from sagging and stretching, and also strengthen it, thereby making it less liable to breakage while being handled; further, in the combination, with a honey-comb foundation produced from wax, of one or more supporting wires or strands extending across the foundation at suitable points to prevent sagging when in the hive and breakage in handling.

As is well known, artificial honey-comb foundations are produced from sheets or cakes of wax, which are pressed between rollers or dies, whereby the sheets receive a series of hexagonal depressions, presenting the appearance of a honey-comb in section. These foundations are placed in the bee-hives, and by this arrangement the bees are caused to build their cells regularly. In all the artificial honey-comb foundations of this class known to me the bottoms of the hexagonal depressions have been made in the form of an inverted pyramid, and in order to produce this shape a considerable depth of wax is required, and, furthermore, the operation of forming such foundations requires great care.

My foundation is made of a cake, A, of wax, with a series of hexagonal depressions, *a*, the bottoms *b* of which are flat, and, in fact, form a continuous flat sheet, (see Fig. 2,) from each side of which rise the ribs *c c'*, forming the sides of the hexagons.

In order to give additional strength to the flat bottom of each depression, the ribs *c* on one side of the cake A are so placed that they unite in the center of one of the depressions on the opposite side, and vice versa, as indicated by dotted lines in Fig. 1 of the drawings. By this arrangement I am enabled to produce artificial honey-comb foundations with great economy of wax, since the weight of one of my flat-bottomed foundations is less than one-half of that of one of the old foundations with pyramidal bottoms covering the same; and, furthermore, my flat-bottomed foundations can be formed much easier than those with pyramidal bottoms, so that in their production a considerable saving of time and labor is effected in addition to the saving in stock.

In order to increase the strength of the artificial honey-comb foundation produced from wax, I apply to the same a series of wires, *d d*, which pass through the foundation. These wires may be inserted into the sheets of wax before they are pressed between the rollers or the dies; or they may be inserted during the process of manufacture in any suitable manner, the characteristic feature or principle of my invention being that the wires or strands of inelastic material are embedded in the cake or foundation, or traverse the same on either or both sides. These wires pass through or are inserted into the foundation at a distance of about seven-eighths of an inch apart.

Of course I do not limit myself to this precise distance; but I have found that the best result is obtained if the wires are thus placed.

By this arrangement I strengthen the honey-comb foundation, making it less liable to injury while being handled, and also to prevent it from sagging or stretching, to which foundations of this class are subjected, particularly in hot weather.

Of course I do not limit myself to wires to produce this result, since threads or strands of any inelastic or non-expanding material may be used as well.

I do not claim as my invention an artificial honey-comb foundation produced from a cake of wax having on each side hexagonal depressions with pyramidal bottoms, such being old and well known.

What I claim as new, and desire to secure by Letters Patent, is—

1. As a new article of manufacture, an artificial honey-comb foundation produced from a cake of wax having on each side a series of hexagonal depressions with flat bottoms, said bottoms forming a continuous sheet, from each side of which rise the ribs which form the borders of the hexagonal depressions, substantially as shown and described.

2. The combination, with a honey-comb foundation produced from wax, of wires or strands embedded in and passing through the foundation to increase its strength and durability, substantially as set forth.

3. The combination, with a honey-comb foundation made of wax, of one or more supporting-wires extending across the foundation, whereby the sagging of the foundation is obviated when in the hive and the liability to breakage in handling is prevented.

In testimony that I claim the foregoing I have hereunto set my hand and seal this 20th day of June, 1879.

JOHN E. HETHERINGTON. [L. S.]

Witnesses:
CHAS. McLEAN,
JAMES D. CLYDE.